US008682335B2

(12) United States Patent
Shah

(10) Patent No.: US 8,682,335 B2
(45) Date of Patent: *Mar. 25, 2014

(54) SYSTEM AND METHOD FOR CONSTRUCTING A CARRIER TO INTERFERENCE MATRIX BASED ON SUBSCRIBER CALLS

(71) Applicant: AT&T Mobility II LLC, Atlanta, GA (US)

(72) Inventor: Dipesh Hasmukhlal Shah, Fremont, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,938

(22) Filed: Jun. 28, 2013

(65) Prior Publication Data

US 2013/0288666 A1 Oct. 31, 2013

Related U.S. Application Data

(63) Continuation of application No. 13/537,480, filed on Jun. 29, 2012, now Pat. No. 8,498,648, which is a continuation of application No. 10/979,126, filed on Nov. 3, 2004, now Pat. No. 8,233,907.

(51) Int. Cl.
*H04W 40/00* (2009.01)
*H04W 4/00* (2009.01)

(52) U.S. Cl.
USPC .......................................... 455/447; 370/329

(58) Field of Classification Search
USPC .......... 370/347, 336, 450, 328, 329; 455/447, 455/423, 446
See application file for complete search history.

(56) References Cited

U.S. PATENT DOCUMENTS

| 6,347,217 B1 | 2/2002 | Bengtsson et al. |
| 6,487,414 B1 | 11/2002 | Tanay et al. |
| 6,496,697 B2 | 12/2002 | Jensen |
| 6,535,747 B1 | 3/2003 | Shah et al. |
| 6,853,842 B1 * | 2/2005 | Wilson et al. ................. 455/423 |
| 6,873,848 B2 * | 3/2005 | Schloemer .................... 455/445 |
| 7,436,879 B1 * | 10/2008 | Iwamoto et al. .............. 375/150 |

(Continued)

OTHER PUBLICATIONS

Office Action dated Jun. 16, 2006 for U.S. Appl. No. 10/979,126, 35 pages.

(Continued)

*Primary Examiner* — Michael Faragalla
(74) *Attorney, Agent, or Firm* — Amin, Turocy & Watson, LLP

(57) ABSTRACT

A conventional wireless device constantly measures the signal strength of its server base station and the strength of signals from surrounding base stations for handoff purposes. The wireless device transmits this information to its serving base station, which discards the information a short time afterward, following handoff. The present system and method store the formerly discarded information in one of several existing network elements or in a separate computer system. This information is used to generate a carrier to interference ratio, which indicates the level of interference between station pairs, and to also generate a carrier to interference matrix, including identifying potential interference for each station pair. The frequency of occurrences during predetermined desired periods of time and the volume of traffic affected by each level of interference may also be calculated. This provides comprehensive, continuous, real-time information for wireless frequency planning.

20 Claims, 6 Drawing Sheets

(56) References Cited

U.S. PATENT DOCUMENTS

| | | |
|---|---|---|
| 2002/0042269 A1 | 4/2002 | Cotanis |
| 2004/0233867 A1 | 11/2004 | Wheatley et al. |
| 2005/0085233 A1 | 4/2005 | Boyer et al. |
| 2006/0014542 A1 | 1/2006 | Khandekar et al. |

OTHER PUBLICATIONS

Office Action dated Oct. 30, 2006 for U.S. Appl. No. 10/979,126, 16 pages.

Office Action dated May 29, 2007 for U.S. Appl. No. 10/979,126, 16 pages.

Office Action dated Sep. 12, 2007 for U.S. Appl. No. 10/979,126, 15 pages.

Office Action dated Jan. 4, 2011 for U.S. Appl. No. 10/979,126, 16 pages.

Office Action dated Jul. 18, 2011 for U.S. Appl. No. 10/979,126, 14 pages.

Office Action dated Oct. 28, 2011 for U.S. Appl. No. 10/979,126, 13 pages.

Office Action dated Aug. 29, 2012 for U.S. Appl. No. 13/537,480, 11 pages.

Office Action dated Dec. 21, 2012 for U.S. Appl. No. 13/537,480, 11 pages.

\* cited by examiner

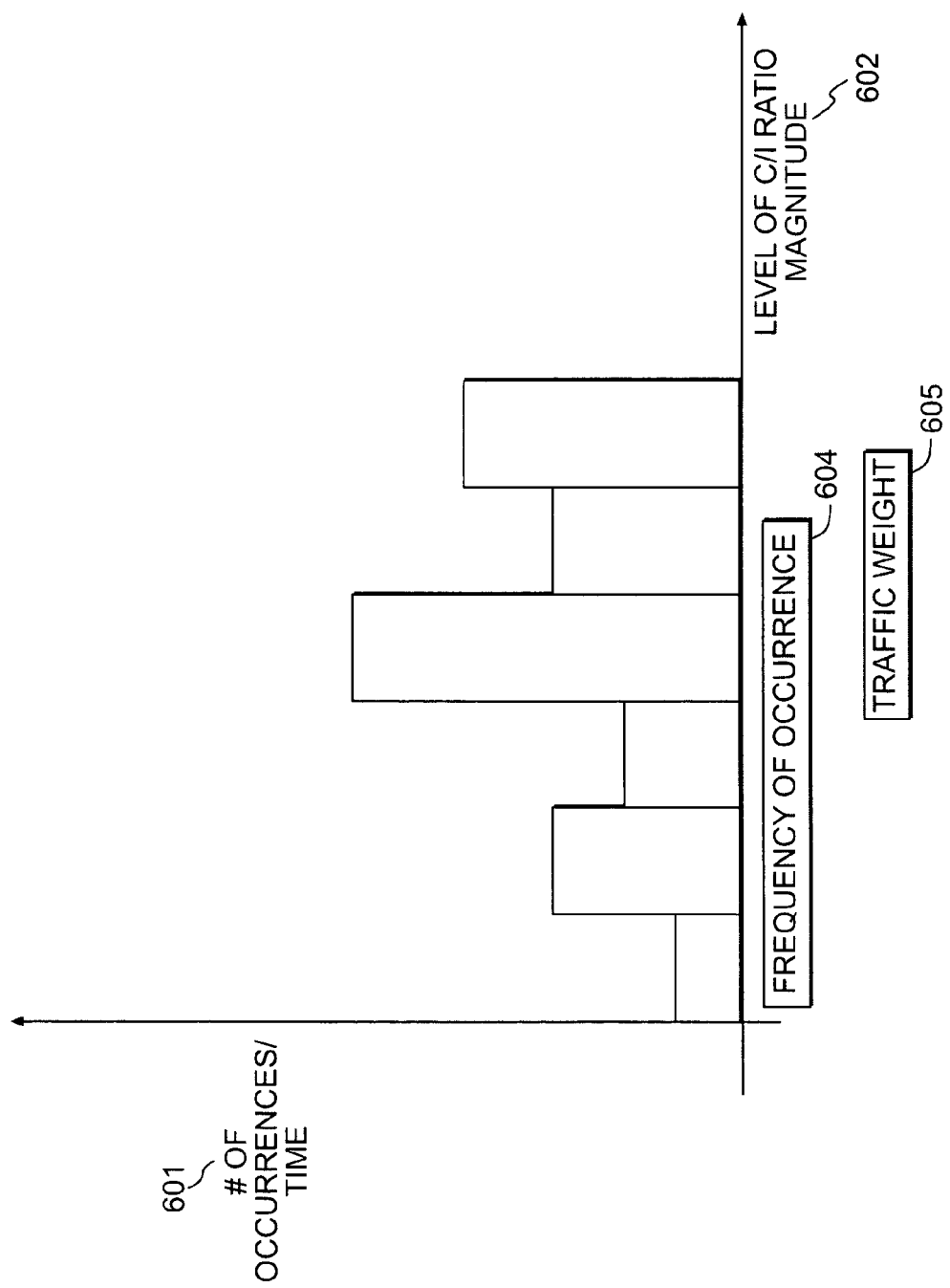

SYSTEM AND METHOD FOR CONSTRUCTING A CARRIER TO INTERFERENCE MATRIX BASED ON SUBSCRIBER CALLS

CROSS-REFERENCE TO RELATED APPLICATIONS

This application is a continuation of U.S. patent application Ser. No. 13/537,480 filed Jun. 29, 2012 and entitled "SYSTEM AND METHOD FOR CONSTRUCTING A CARRIER TO INTERFERENCE MATRIX BASED ON SUBSCRIBER CALLS" which is a continuation of U.S. Pat. No. 8,233,907 filed Nov. 3, 2004 entitled "SYSTEM AND METHOD FOR CONSTRUCTING A CARRIER TO INTERFERENCE MATRIX BASED ON SUBSCRIBER CALLS" both of which are incorporated herein by reference.

BACKGROUND OF THE INVENTION

1. Field of the Invention

The present invention relates to the field of frequency planning for wireless networks.

2. Description of the Related Art

As wireless subscribers travel, they are switched between different transmitter, or cell, sites. Each site may be divided into sectors, with each sector served by one or more base stations located at the transmitter site. A base station, or base transceiver station, comprises an antenna and a radio transceiver at the cell site. In order to accommodate as many users as possible, the base station is not in constant contact with each wireless device operating in its range. Instead, when a wireless device enters the coverage area of a cell, it contacts the server base station through a control channel. This control channel carries information between the wireless device and the server base station necessary for the wireless device to operate properly with the server base station. When a user initiates a wireless operation, the wireless device instructs the server base station, through the control channel, that the device is attempting an operation. The server base station then switches the wireless device to a traffic channel to conduct the operation.

As the wireless subscriber continues to travel, the wireless device must switch from one cell to another. This process is known as a handoff. To facilitate the handoff process, the wireless device constantly measures the control channel signal strength of the server base station, and the signal strength of the signals from base stations serving adjacent sectors or located at neighboring towers, to determine which one will provide the best service. The wireless device transmits these signal strength measurements back to the server base station, which stores the measurements to compute an average over a short period of time. In a GSM system, the data is transmitted once every 480 microseconds and in TDMA systems once per second. As these data are transmitted so frequently and the wireless subscriber may be moving rapidly, any data over ten seconds old is not useful for purposes of evaluating the need for a handoff and is constantly purged from the server base station shortly after receipt.

When neighboring sites or sectors are transmitting the same frequency (i.e., are co-channels), they may interfere with each other. To mitigate this co-channel interference, cellular providers institute frequency planning. The carrier-to-interference (C/I) ratio is a measure of the strength of the desired signal relative to that of interference signals.

To track the level of interference, it is standard to construct a matrix of C/I values for neighboring base stations. The frequency planners are then able to use the data in this matrix to better adjust for interfering frequencies. Several prior art methods of developing this matrix are currently in use.

One method for creating the C/I matrix is often termed the "Listening only Control Channel" (the "LICC" or "Ericsson") method. This method entails measuring the control channel signal strength of the site in question. A LICC capability must be added for each site sector (using otherwise valuable bandwidth). This method involves measuring the signal strength of the uplink (the signal from the wireless device to the tower), and during the data collection period, the two traffic channels associated with the control channel must be blocked. When a user originates a call, a request is sent over the control channel to its server base station. It is the strength of this uplink signal that is measured.

There are a number of drawbacks to this method: (1) the only measurement made is during the initial communication with the base station and because the data points collected are limited to those associated with originations, the geographical scope is limited; (2) the transceiver uses valuable bandwidth that thus cannot be used for normal communications; (3) cells for which most of the traffic involves handoffs do not provide enough data points for the C/I matrix; and (4) the only measurement taken is on the uplink and therefore this approach does not actually measure the signal strength on the downlink, so that, as indicated above, only a limited number of data points are collected as compared to the average call length.

A second method for collecting interference data is the "Drive Test" method. In this method, a color code identifies each base station by frequency. A technician travels to various geographical locations and measures the signal strength at that location. The digital verification color code identifies the base station transmitting each signal. The technician measures all of the signals at each location and the strongest signal should indicate the server station. Therefore, the matrix must be manually generated by entering the data collected for each station by hand.

The first drawback of the "Drive Test" is that this method is geographically limited. It will not be possible to take measurements from within many buildings or on side streets, so the areas sampled will be limited. Power control is in the downlink (tower to wireless device) direction, and the station will dynamically adjust power as necessary to ensure transmittal. Therefore, the measurement may be of an intentionally low power signal. This test is expensive to implement because someone must be paid for the time of driving between sites to take measurements and entering the data. Also, changes in the topography and signal propagation resulting from new buildings and other structures require taking new measurements. The color code system only functions if there is a moderate level of interference. If two signals measured are both strong, then it will be difficult to decode the color code, and the technician must manually turn the signals on and off at each base station to test them and to determine which is likely causing the interference.

A third method is called the "Predictive Method" and uses propagation models. Because each signal degrades as it propagates through the air, computer models may be used to determine where the signals may interfere. However, this method also suffers from several drawbacks. First, there is a high degree of error because there are no actual measurements. Second, the models do not take into account differences in terrain or buildings. Third, any changes in the system require a new evaluation. Therefore, the model is inherently conservative in order to take into account the practical differences.

Because each of the three methods has a high cost in labor, or equipment, or both, there is a need for a system to inexpensively collect and process the necessary data for a C/I matrix.

Additionally, each of the prior methods accurately measures or predicts only that interference relating to the geographical features existing at the time the measurements are taken. It is desirable to have an automatic process that continuously collects new data as new buildings, roads and highways are constructed. To the extent that the prior art methods attempt to collect and measure actual data, these methods require the use of extra equipment or the dedication of valuable bandwidth to the measuring process, rather than keeping the bandwidth available to service customers.

Further, none of the prior methods result in measurements that accurately reflect the interference within the system during operation because the data is collected during a very small amount of time as compared to the average length of a call, is limited in geographic scope because a technician is not able to access every possible location to take measurements, or has a high error rate because the method is based on computer models, not actual circumstances.

Therefore, a system that uses current data and continuously monitors all calls from any geographic location and collects data during the full duration of these calls without using additional bandwidth would be very desirable and useful. Desirably, such a system would collect accurate and complete real-time, actual-use data to create a more accurate and useful C/I matrix and would thus enable the provider to better plan its frequency usage, thereby more effectively using available frequencies and better serving its customers.

SUMMARY OF THE INVENTION

Among the advantages thereof, the present invention solves the current problems associated with constructing a Carrier to Interference (C/I) matrix by establishing a new system and method for collecting and processing data resulting from actual customer calls. Further, in a preferred embodiment thereof, the system and method also calculates values for the frequency of occurrence of interference in a given measurement period and the volume of traffic affected (traffic weight) by the given magnitude of the interference.

The invention preferably uses existing network infrastructure and procedures to provide signal strength data necessary to construct the C/I matrix. In this regard, wireless devices conventionally measure and transmit to the base station, the signal strengths of the base station and of nearby stations for use in determining whether handoff is needed. In accordance with an important aspect of the invention, the signal strength measurements, which are normally discarded, are collected and used to provide the source data.

According to one aspect thereof, the present invention uses the measurements provided by each wireless device with respect to the signal strength of its server base station and neighboring base stations. The wireless device measures the signal strength of the downlink signal (i.e., the signal from the call tower to the wireless device from each of these stations) and, in a preferred embodiment, transmits the measurements back to the server base station. According to this aspect of the invention, these measurements are collected and used to determine the magnitude of the C/I ratio (which is, as indicated above, a measure of the magnitude of the interference), the frequency of occurrence of interference of the given magnitude, and the traffic weight (and therefore, the approximate number of customers) affected by that interference.

The system of the present invention is automated and is, therefore, substantially more efficient than some of the prior art systems discussed above. Better statistical data is provided because the wireless device constantly takes signal strength measurements during a call. Also, because wireless devices are used everywhere and the signal strength measurement is automatic, there are no geographic limitations on the measurements, as with other methods. Thus, an actual-use sampling of data is provided between wireless sites and sectors, something that other methods cannot provide.

Further, the system and method of the present invention avoid the need to dedicate valuable bandwidth in obtaining the signal strength measurements and are capable of processing the data so obtained using automated systems that reduce the time and expense normally associated with processing such data and creating a C/I matrix.

Further features and advantages of the present invention will be set forth in, or apparent from, the detailed description of preferred embodiments thereof which follows.

BRIEF DESCRIPTION OF THE DRAWINGS

Many aspects of the invention will be better understood by reference to the following drawings, in which:

FIG. 6 is a histogram generated by an embodiment of the present invention.

DETAILED DESCRIPTION OF THE INVENTION

A system or method in accordance with the present invention may serve various multi-technology wireless devices providing voice, data, video, or any other content. Further, the technologies employed may employ any transmission method including digital, analog or a combination of digital and analog. Therefore, the term wireless device as understood herein includes all devices capable of the wireless electronic communication of any type of data.

A system or method in accordance with the present invention may be implemented with hardware, firmware, software or a combination thereof. Both information storage and computations may be accomplished through an information processor and a memory device. These may be located within multiple network elements comprising a data processor, including but not limited to, a base station, a Mobile Switching Center (MSC), a Base Station Controller (BSC), an Operations Center (OC) or a separate system.

Figure 1:
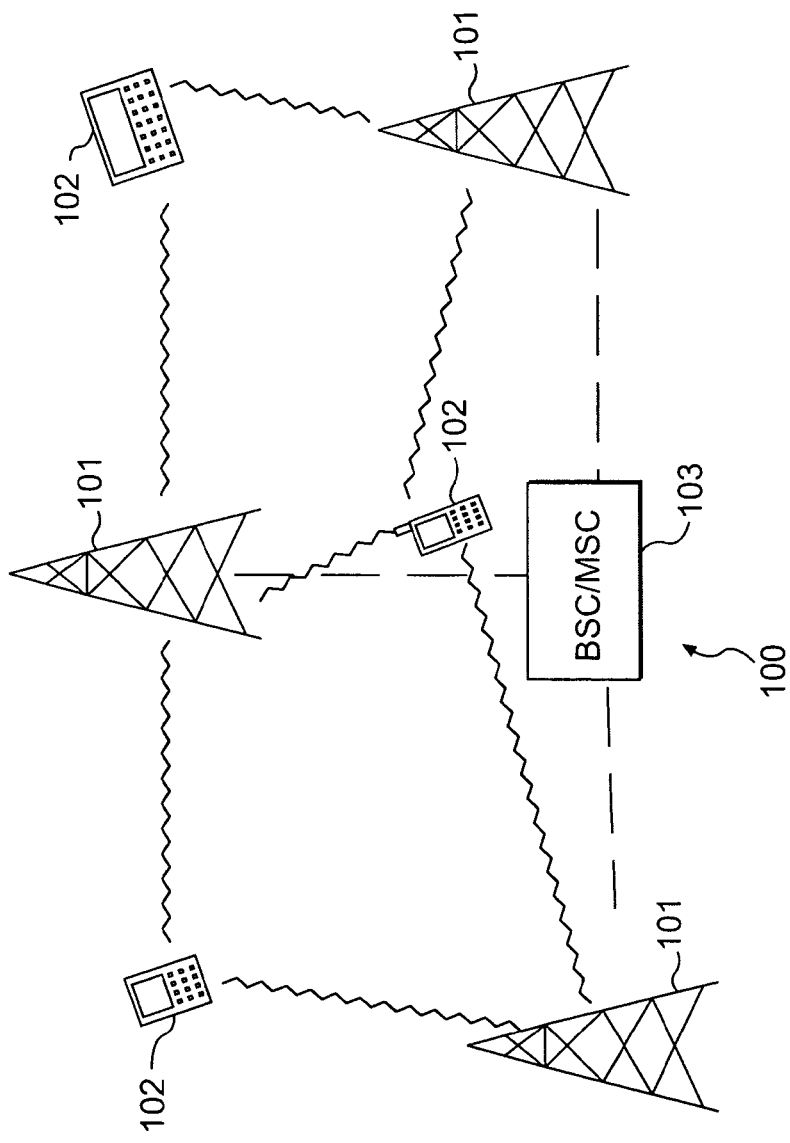
FIG. 1 is a schematic diagram of a prior art wireless network.

Referring now to the figures, wherein like numbers represent like elements throughout, FIG. 1 illustrates an exemplary network of wireless transmitters, denoted 101, which provide geographic coverage for wireless devices denoted 102. The transmitters 102 are interconnected by, and communicate, either directly or indirectly, through, a Mobile Switching Center 103. For purposes of illustration only, GSM base stations are linked through a Base Station Controller to the Mobile Switching Center 103. TDMA base stations would be linked directly to the Mobile Switching Center 103. The invention described herein is compatible with, for purposes of illustration and not limitation, a fully wireless system or a partially wireless system.

As FIG. 1 further illustrates, and as is well known, wireless devices 102 communicate with and through wireless transmitters 101. The wireless devices 102 herein are equipped to communicate, with the proper network protocol, through the wireless transmitters 101 and, as explained below, to measure the signal strength of the transmissions from a number of wireless transmitters 101.

Figure 2:
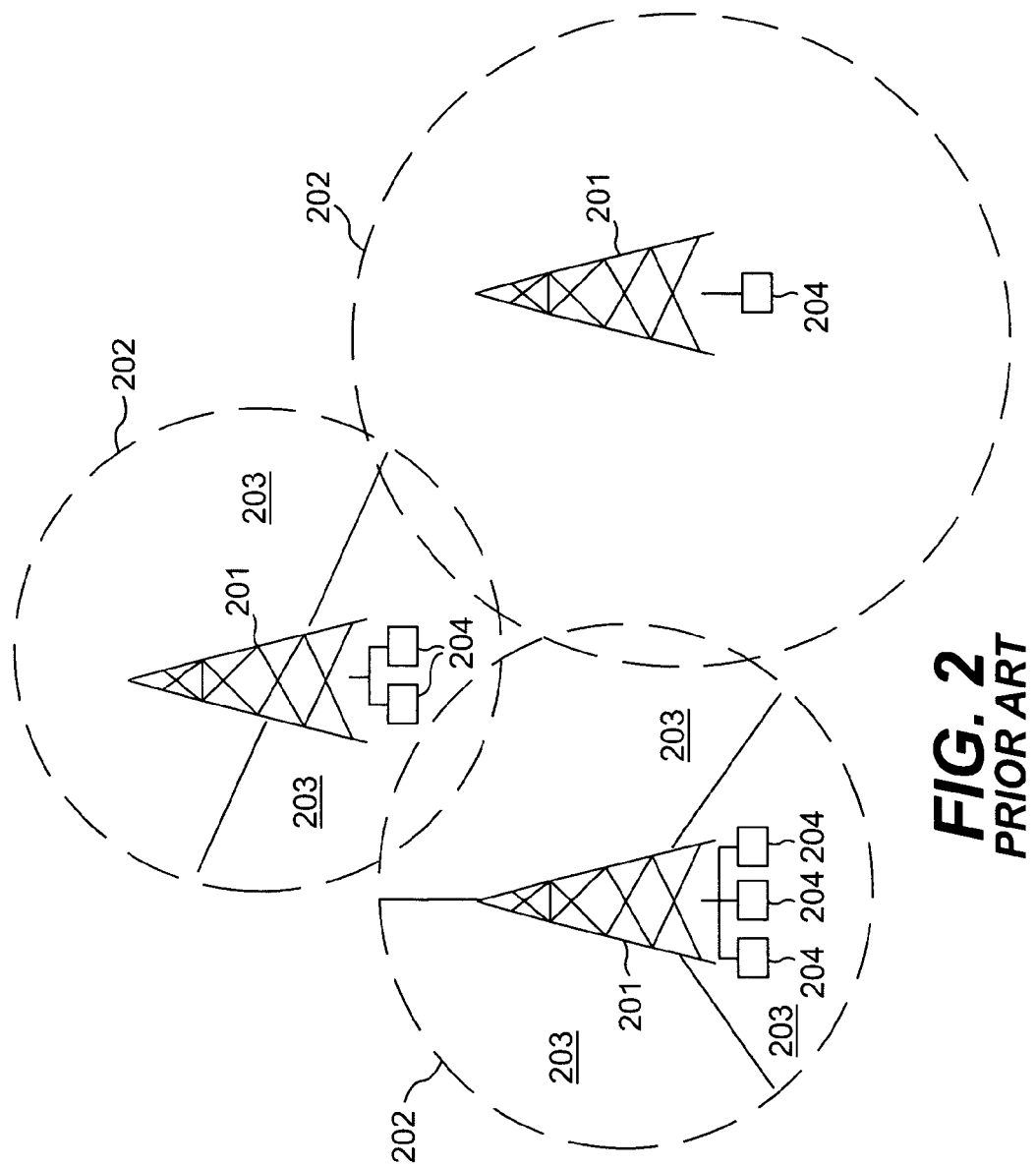
FIG. 2 is a schematic diagram depicting a plurality of prior art transmission sites that may broadcast interfering signals.

FIG. 2 illustrates a network of three wireless transmitter sites 201. The transmitted signals from the sites are denoted 202. The coverage area for each wireless transmitter 201 is denoted 203 and is illustrated as being, but is not limited to, a 360-degree region surrounding the corresponding wireless transmitter 201. Each coverage area 203 may be divided into a number of sectors, or divisions within the coverage area, denoted 205. When two or more wireless transmitters 201 operate on the same frequency or operate in sectors 205 on the same frequency, such operation is herein termed "co-channel operation."

Each wireless transmission site 201 may be associated with one or more base stations 206. When a wireless device operates through a particular transmission site 201, the device operates through a base station 206 at the site. The base station in such an operation is herein termed the server base station. A wireless device may also simultaneously receive a signal from another base station 206 in a different sector or located at a different neighboring transmission site 201. Such a signal is considered to be from what is herein termed a potentially interfering base station. The number of base stations 206 at a wireless transmission site 201 defines the number of sectors 205 into which the coverage area 203 for that site is divided, since each base station 206 serves one sector 205. By way of example, referring to FIG. 2, one base station 206 may serve the entire geographic area 203 covered by a wireless transmission site 201 as indicated by the site 201 shown at the right hand portion of FIG. 2, or serve one or more sectors 205 within area 203, as illustrated by the sites 201 shown at the center and left hand portions of FIG. 2.

Figure 3:
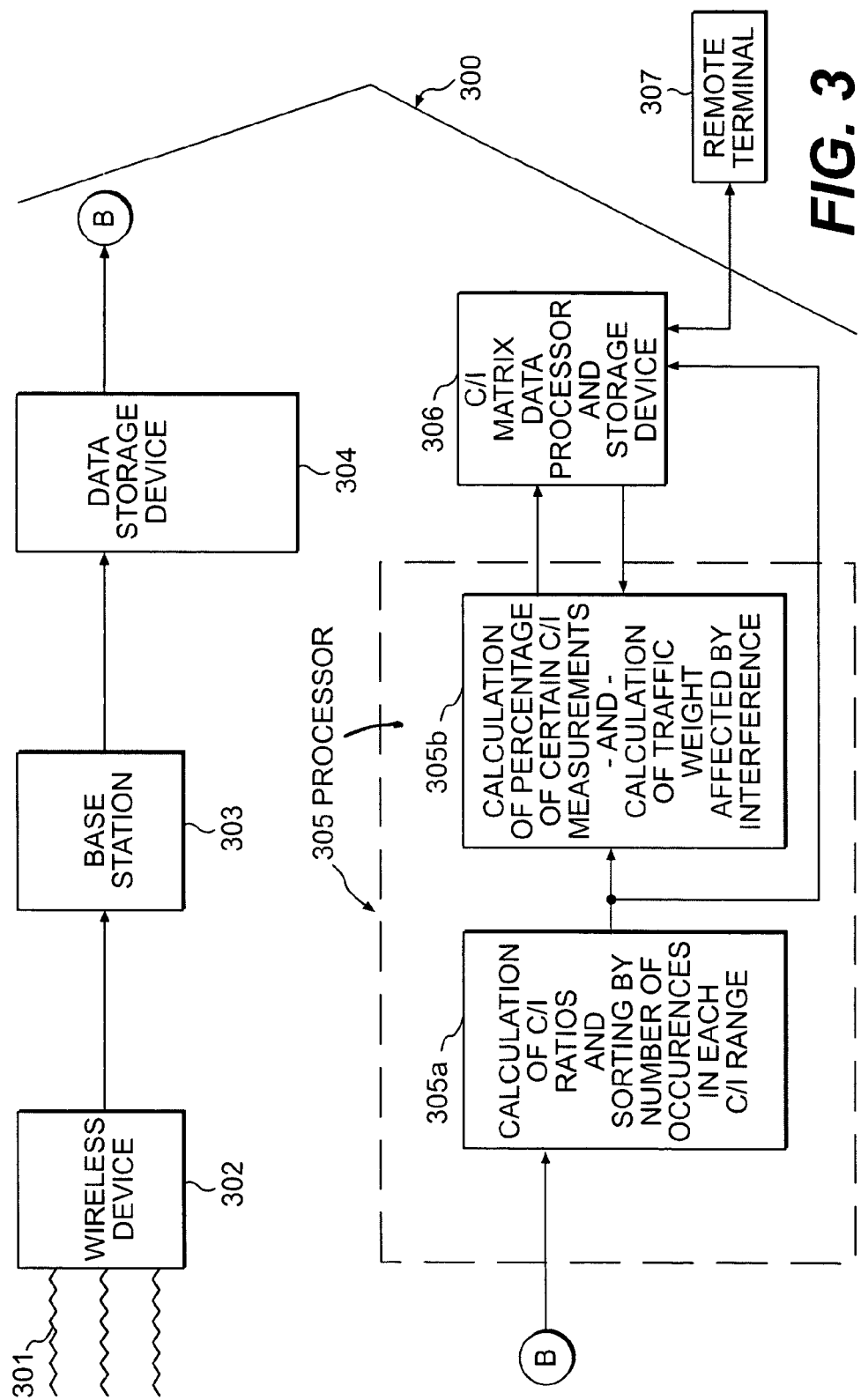
FIG. 3 is a schematic block diagram of a system in accordance with an exemplary embodiment of the present invention for constructing a C/I matrix.

FIG. 3 illustrates an exemplary system or method according to one preferred embodiment of the present invention. The system, which is generally denoted 300, includes a data storage device 304 for storing measurements of the strength of signals 301 received by the wireless device 302 from a server base station and potentially interfering base stations. In the illustrated embodiment, the various signal strength measurements are transmitted to the base station 303, and then to the data storage device 304.

Periodically, the stored measurements from storage device 304 are supplied or transmitted to a processor 305 which performs calculations based upon the signal strength measurements. These calculations are used to produce at least one interference indicia, such as the C/I ratio but may also produce other interference indicia. These calculations are also used to create a corresponding C/I matrix. The C/I matrix is transmitted to a C/I processor and data storage device 306 for storing the resulting matrices for further evaluation.

The wireless device 302 continuously measures the strength of the signal 301 from the server base station through which the device 201 is operating as well as the strength of the signals 301 from the base stations of the neighboring sectors and transmission sites. The signal strength measurements in this exemplary embodiment are logarithmic values corresponding to the measured strength of the signals 301.

In a preferred embodiment, data storage device 304 provides for long-term storage of these signal strength measurements for signals 301 from the server base station 303, and the signals 301 from each of the potentially interfering base stations, each pair (i.e., the server base station and the individual base station) being herein termed a base station pair. The data storage device 304 may be located at any place in the network system, including but not limited to, the base station, the base station controller, the mobile switching center, the operations center, a stand alone apparatus connected to the wireless network, and the like.

As mentioned above and indicated by block 305a, the processor 305 will calculate a C/I ratio for the given base station pair. This C/I ratio indicates the level of interference between the base station pair. The calculation is carried out by the processor 305 by dividing the value for strength of the signal 301 from server base station, herein termed the carrier signal strength "C," by the value for the strength of the signal 301 from each potentially interfering base station, herein termed the interference signal strength "I,"

Remembering that in this implementation each of the signal strength values C and I is logarithmic, the calculation of the ratio between each of the base station pairs involves subtracting the logarithmic value for the signal from the interfering base station from the logarithmic value for the signal from the server base station 303. Thus, a C/I ratio indicating little interference will be a large number, a C/I ratio indicating substantial interference will be a low number approaching zero, and a C/I ratio indicating that the signal from the interfering station is stronger than the server station 303 will be a negative number. These data sets will be available for each instance a wireless device 302 measures the signal strengths for each base station pair. The data storage device 306 stores the data sets.

In a preferred embodiment, the processor 305 also sorts the calculated C/I ratios according to magnitude ranges for the C/I ratio. For example, the number of calculated C/I ratios having a magnitude greater than 20 are sorted separately in one range, as are those in other ranges, e.g., between 9 and 10, 8 and 9, etc., down to those between 1 and zero and those having a negative value. The data storage device 306 stores the number of instances that the calculated C/I ratios occur for each range of interest.

As indicated by block 305b, in a preferred embodiment, the processor 305 is also programmed to compute the value, as a percentage, of the frequency of occurrences of a specified C/I ratio or over a selected measurement period. The frequency of occurrence calculation for a given C/I ratio is accomplished by dividing the number of occurrences of the specific C/I ratio by the total number of measurements taken in the given time period for the same base station pair, and then multiplying the result by one hundred. This value corresponds to the frequency with which the particular C/I ratio magnitude occurs. Preferably, this calculated value for frequency of occurrence is also stored in the data storage device 306.

As is also indicated by block 305b, the processor 305 also may calculate the volume of traffic, herein termed traffic weight, affected by the particular C/I ratio magnitude. The traffic weight will be calculated by dividing the number of occurrences of the particular C/I ratio magnitude by the traffic weight constant for the particular wireless network protocol. In the illustrative example, this constant is 1/3600 for TDMA, and 48/3600 for GSM. This calculation provides a measurement of affected traffic weight expressed in Erlangs, the units of measurement for traffic weight. Preferably, these calculated values for traffic weight are also stored in the data storage device 306. The C/I matrix stored in the data storage device 306 may be accessed from a remote terminal 307.

Figure 4:
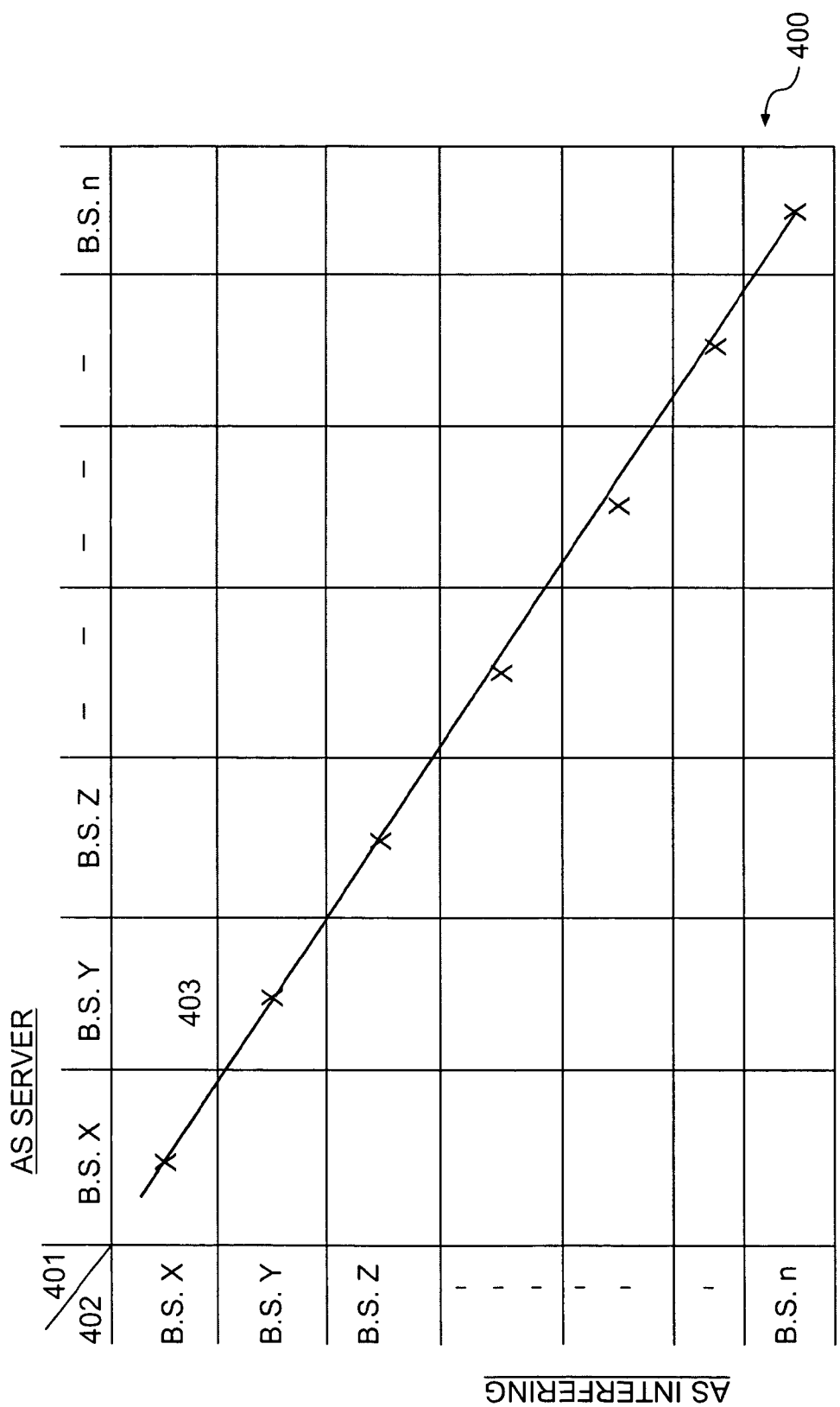
FIG. 4 is an exemplary C/I matrix generated by an embodiment of the present invention.

Referring to FIG. 4, there is shown an exemplary C/I matrix 400. The calculated data processed by the processor 305 and transmitted to data processor and storage device 306 as depicted by the schematic of FIG. 3 provides the information to generate matrix 400. Generally described, the matrix 400 is a two-dimensional plot of a listing of neighboring, and possibly interfering, base stations along the x- and y-axes. One axis 401 contains a listing of the base stations (BS#X . . . BS#n) as used as server stations. The other axis 402 includes the same listing of base stations (BS#X, . . . BS#n) when interfering with the server base stations. Matrix 400 is of the type used in the wireless industry as a frequency planning tool and typically contains the C/I ratio magnitudes between multiple base station pairs. The C/I ratio magnitude for the base station pair represents the corresponding interference, and therefore, potential subscriber problems, created by the base station pair, and is typically used to determine which base station pairs should not be co-channels. The cells in the C/I matrix 400 according to this embodiment may contain specific calculated C/I values but the cells also may contain links either to tables that have been generated or specific values derived from the tables so generated.

Figure 5:
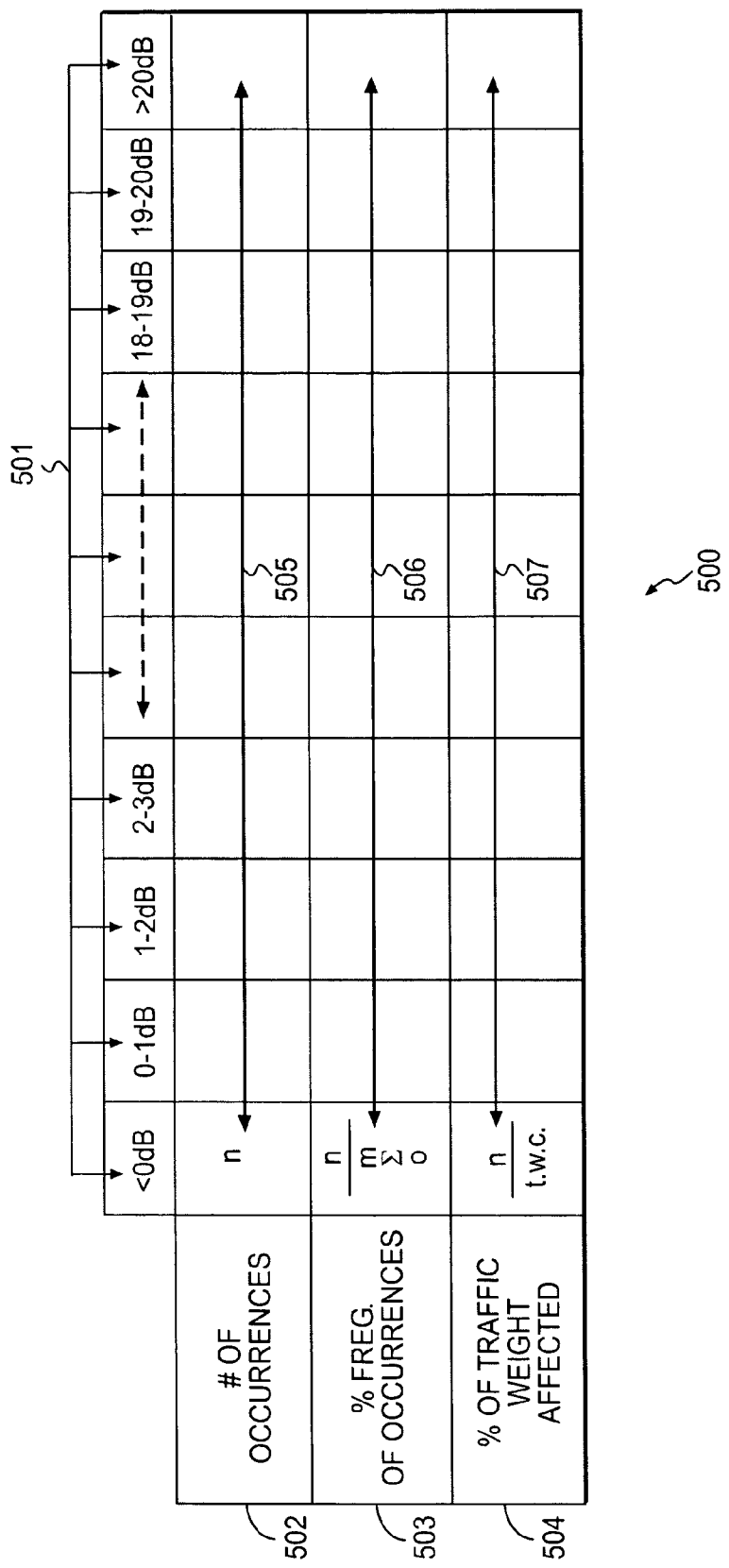
FIG. 5 is an exemplary storage table containing values calculated by an embodiment of the present invention.

Referring to FIG. 5, a table 500 is provided, in accordance with an exemplary embodiment of the invention which lists three important parameters that are useful in frequency planning. These parameters as presented as a function of the desired ranges to be evaluated, indicated at 501, as shown, comprise the number of instances of C/I ratio magnitudes in a certain range, indicated at 502, the frequency of occurrences associated with each range of those C/I ratio magnitudes, indicated at 503, and the traffic weight affected by each range of C/I ratio magnitudes, corresponding to each specific base station pair, indicated at 504. As described above, in one embodiment, a table corresponding to table 500 occupies, referring to FIG. 4, one cell 403 of the C/I matrix 400 corresponding to the base station pair.

The table 500 is created by a processor, such as processor 405 of FIG. 2, that sorts the information by the C/I ratio magnitude ranges 501. Bins or cells 505, each corresponding to a specified C/I ratio magnitude range 501, are incremented by one for each instance that a C/I ratio magnitude is determined for the given range. Similarly, the table 500 also provides the frequency of occurrences indicated at 503, for a given C/I ratio magnitude of the corresponding range, in one bin or cell of the bins or cells 506 corresponding to the different frequency ranges, as well as the traffic weight, indicated at 504, affected by a given C/I ratio magnitude for the measurement period in a bin or cell of the bins of cells 507 corresponding to these different frequency ranges.

Thus, for each base station pair, actual data for a current measurement period is collected and analyzed to determine the number of occurrences of a C/I ratio magnitude, the frequency of such occurrences, and the volume, or traffic weight, affected by the occurrences.

Referring to FIG. 6, in accordance with a further aspect of the invention, a further output is provided in the form of a histogram for each given base station pair. The ordinate or y-axis represents the number of occurrences of C/I ratios over a measurement period, as indicated at 601. The abscissa or x-axis represents the C/I ratio magnitudes, as indicated at 602. The result is a tabular representation of which ratio magnitudes occurred most. Also provided are a representation of the frequency of occurrence of a given C/I ratio magnitude range, as indicated at 604, and of the traffic weight affected by the given magnitude, as indicated at 605.

In one preferred embodiment, a Radio Network Management Server (RNM) is employed in carrying out the method of the invention. The RNM is a standard sub-system in the wireless network that conventionally collects various data for active cells including downlink serving signal strength frequencies (these being generally considered as the channels assigned to the neighbor cell sections). In accordance with this embodiment, the RNM would be configured to collect channel quality messages from every active cell on the associated MSC. Preferably, some channels would be added to in the neighbor list of each cell sector which would allow the wireless devices (mobiles) to perform downlink measurements on these frequencies. The channels are selected so that they help determine the level of interference from specific cell sectors.

Many variations and modifications may be made to the above-described embodiments of the invention without departing from the spirit and the principles of the invention. All such modifications and variations are intended to be included herein within the scope of this disclosure and the present invention and protected by the following claims.

What is claimed is:

1. A method, comprising:
receiving, by a system comprising a processor, signals from wireless antennas on a common frequency of a control channel associated with a station pair,
wherein the wireless antennas comprise base station devices that provide service to different network sectors, and information associated with the signals is stored in a data structure having a number of entries that corresponds to a number of occurrences of an interference parameter within a selected range for the station pair;
determining, by the system, a number of carrier-to-interference occurrences for the station pair;
determining, by the system, a relative percentage for the number of occurrences of the interference parameter;
measuring, by the system, during the measurement period, relative signal strengths with respect to control channel signals transmitted by the wireless antennas; and
determining, by the system, traffic weights for a subset of the number of occurrences of the interference parameter within the measurement period.

2. The method of claim 1, further comprising:
monitoring, by the system, a call for the station pair in a network sector by measuring a signal multiple times during the call to obtain actual use sampling of data for the call during a measurement period.

3. The method of claim 1, further comprising:
approximating, by the system, a number of customers affected by a determined magnitude of interference for the station pair.

4. The method of claim 1, further comprising calculating, by the system, a percentage of the occurrences of the interference parameter within the measurement period.

5. The method of claim 1, further comprising identifying, by the system, signal strength measurements used to switch primary communications between network sectors.

6. The method of claim 5, further comprising storing, by the system, the signal strength measurements used to switch primary communications between network sectors in response to the identifying.

7. The method of claim 1, further comprising determining, by the system, relative signal strengths with respect to control channel signals transmitted by the wireless transmitters.

8. A system, comprising:
a memory to store computer executable instructions; and
a processor, coupled to the memory, which facilitates execution of the computer-executable instructions to perform operations, comprising:

receiving transmissions from wireless transmitters on a frequency of a control channel associated with a station pair, wherein the wireless transmitters comprise base station devices that provide service to different network sectors, and the transmissions are stored with a number incrementable by a number of occurrences associated with an interference parameter within a selected range for the station pair;

determining a number of carrier-to-interference occurrences for the station pair;

determining a relative percentage for the number of occurrences that are associated with the interference parameter during a measurement period;

performing relative signal strength measurements during the measurement period with respect to control channel signals transmitted by wireless transmitters associated with the station pair; and determining traffic weights for a subset of the number of occurrences of the interference parameter within the measurement period.

9. The system of claim 8, wherein the operations further comprise constructing a carrier-to-interference matrix.

10. The system of claim 8, wherein the operations further comprise monitoring a call for the station pair in the network sector by repeatedly measuring a signal strength of a signal associated with the call and obtaining actual use samples of data for the call during the measurement period.

11. The system of claim 8, wherein the operations further comprise approximating a number of customers affected by a determined magnitude of interference for the station pair.

12. The system of claim 8, wherein the operations further comprise determining traffic weights for the occurrences of the interference parameter within the measurement period.

13. The system of claim 8, wherein the operations further comprise identifying and storing signal strength measurements used to switch primary communications between network sectors.

14. The system of claim 8, wherein the wireless transmitters associated with the station pair comprise base station devices that provide service to network sectors that are different.

15. The system of claim 8, wherein the operations further comprise determining signal strengths with respect to control channel signals transmitted by the wireless transmitters.

16. A tangible computer readable storage device comprising computer-executable instructions that, in response to execution, cause a computing device comprising a processor to perform operations, comprising:

receiving transmissions from wireless transmitters on a common frequency of a control channel associated with a station pair, wherein the wireless transmitters are cellular base station devices that provide service to different network sectors, wherein the transmissions are stored in a table having a number incrementable by a number of occurrences of an interference parameter within a selected range for the station pair;

determining a number of carrier-to-interference occurrences for the station pair;

determining a relative percentage for the number of occurrences;

measuring during a measurement period, relative signal strengths with respect to control channel signals transmitted by the wireless antennas; and determining traffic weights for a subset of the number of occurrences of the interference parameter within the measurement period.

17. The tangible computer readable storage device of claim 16, wherein the operations further comprise identifying and storing signal strength measurements for switching primary communications between network sectors.

18. The tangible computer readable storage device of claim 17, wherein the operations further comprise analyzing the signal strength measurements to determine the interference parameter.

19. The tangible computer readable storage device of claim 16, wherein the operations further comprise approximating a number of customers affected by a determined magnitude of interference for the station pair.

20. The tangible computer readable storage device of claim 16, wherein the operations further comprise monitoring a call for the station pair in a network sector and obtaining actual use samples of data by multiply measuring signal strengths of a signal associated with the call during the measurement period.

* * * * *